April 24, 1956   R. J. EDWARDS   2,743,026
AUTOMATIC DISCHARGE CONTROL FOR TRUCK BODIES
Filed July 19, 1954   4 Sheets-Sheet 1
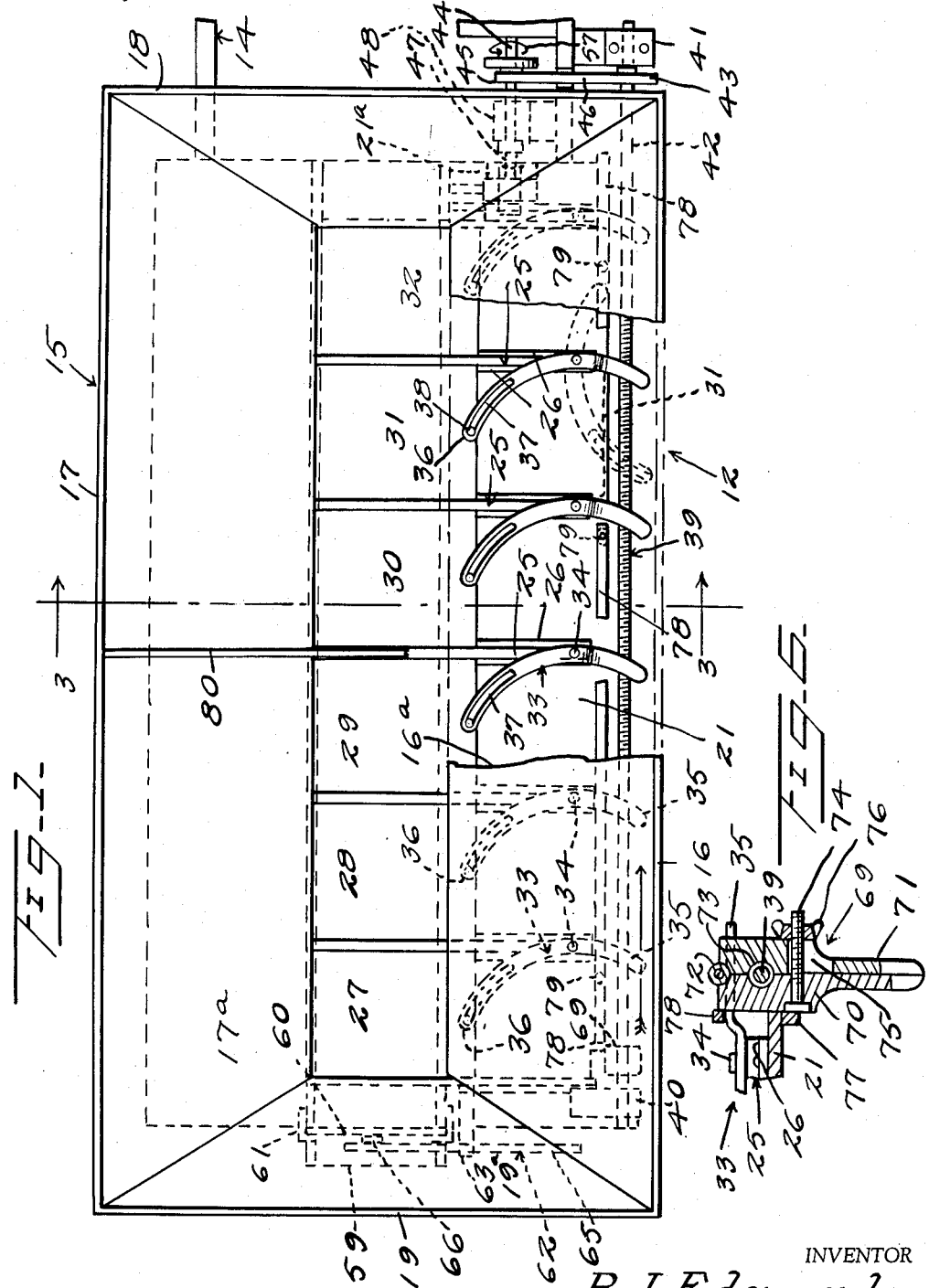
INVENTOR
R. J. Edwards
BY John N. Randolph
ATTORNEY

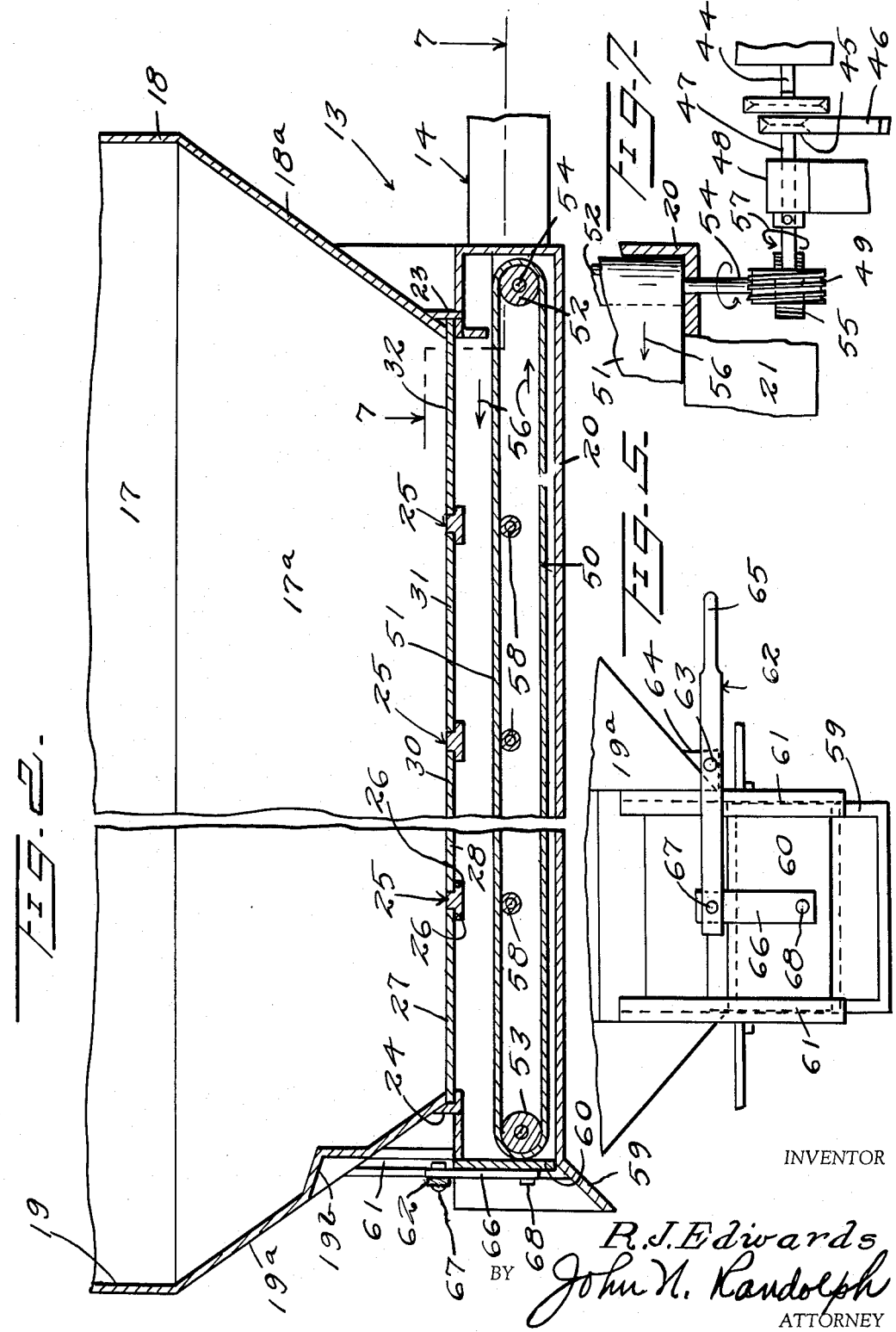

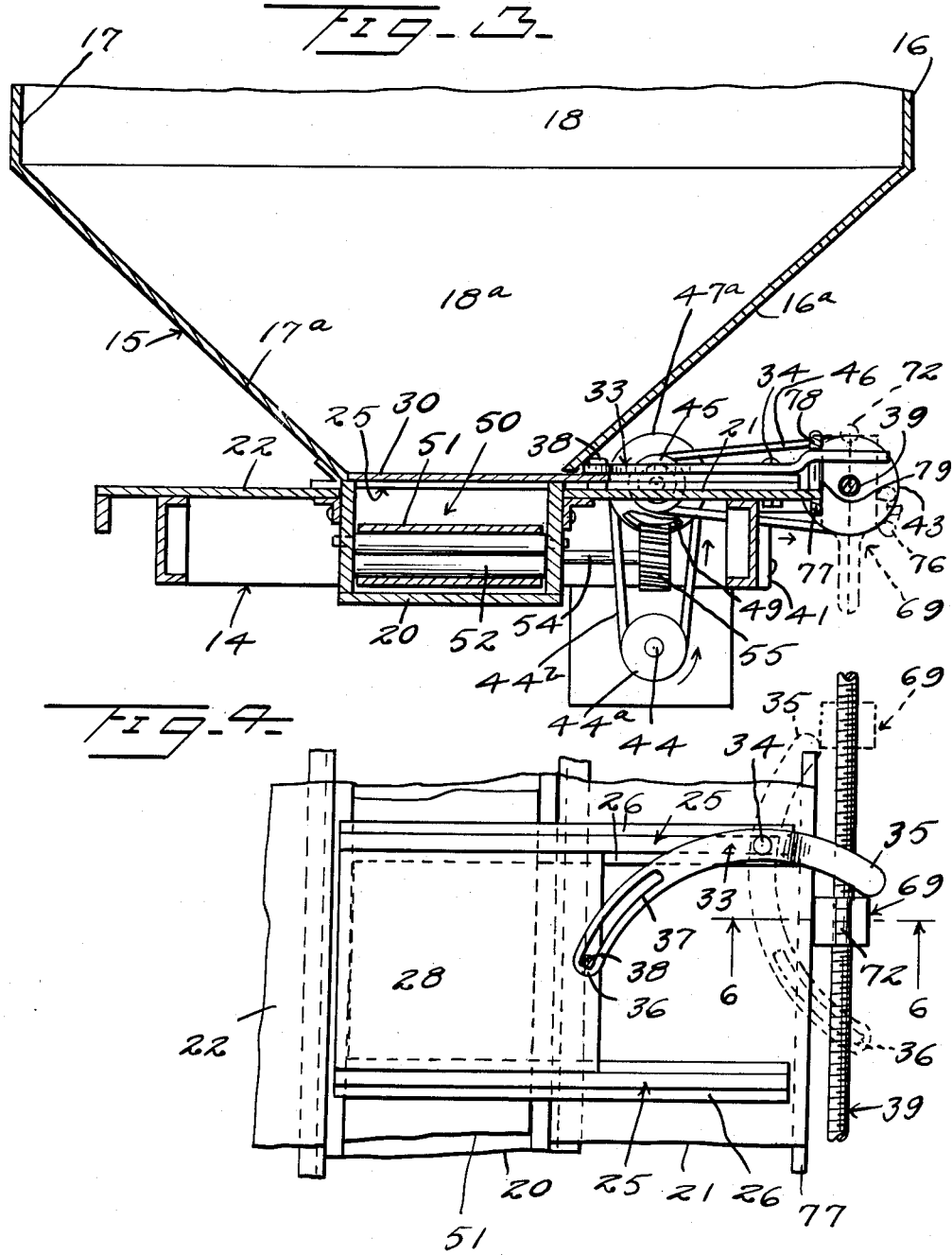

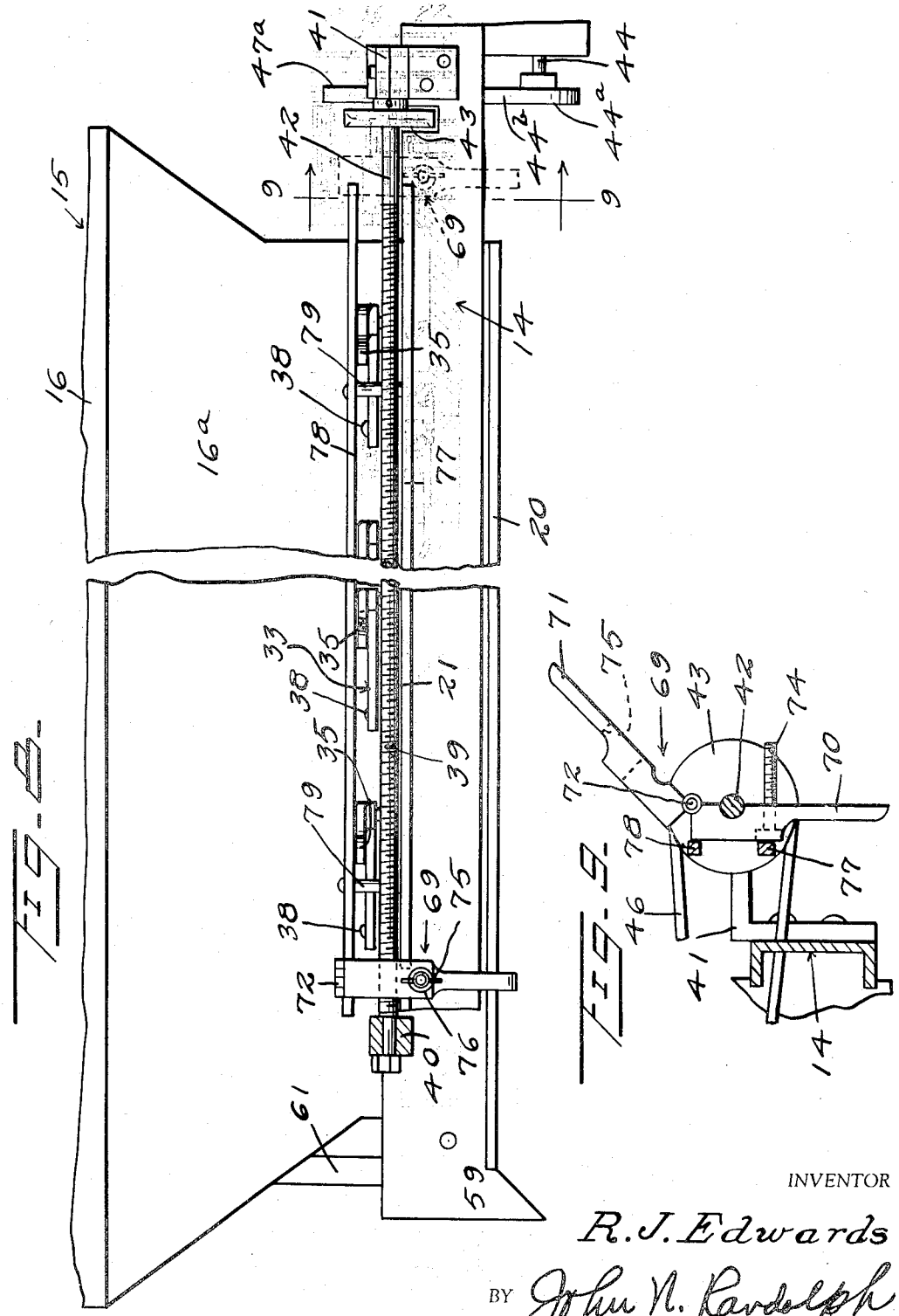

United States Patent Office 2,743,026
Patented Apr. 24, 1956

2,743,026

AUTOMATIC DISCHARGE CONTROL FOR TRUCK BODIES

Ralph J. Edwards, Knoxville, Tenn.

Application July 19, 1954, Serial No. 444,101

9 Claims. (Cl. 214—83.2)

This invention relates to a novel automatic control associated with and forming a part of a truck for regulating the discharge of a fluent material, such as coal, from the truck body.

More particularly, it is a primary object of the present invention to provide an automatic control means which will enable one operator, as for example the driver of a truck, to handle the discharge or unloading of the truck and which operation normally requires the services of two men.

A further and particularly important object of the invention is to provide a novel control for regulating the discharge or unloading of a truck body and by means of which overloading and choking of the conveyor apparatus, employed for conveying the material longitudinally of the truck body, will be eliminated.

Various other objects and advantages of the invention will hereinafter become more fully apparent from the following description of the drawings, illustrating a presently preferred embodiment thereof, and wherein:

Figure 1 is a top plan view, partly broken away, showing a portion of a truck including the truck body, the power takeoff shaft of the truck, and showing the automatic discharge control associated therewith;

Figure 2 is an enlarged fragmentary longitudinal, substantially central sectional view of the truck body and including the automatic discharge or unloading control;

Figure 3 is an enlarged fragmentary cross sectional view taken substantially along a plane as indicated by the line 3—3 of Figure 1;

Figure 4 is a fragmentary plan view of a portion of the unloading control with the upper portion of the truck body or hopper omitted;

Figure 5 is a fragmentary end elevational view looking toward the rear end of the truck body, from left to right of Figure 2;

Figure 6 is an enlarged fragmentary cross sectional view taken substantially along a plane as indicated by the line 6—6 of Figure 4;

Figure 7 is a fragmentary horizontal sectional view, partly in top plan, illustrating the drive for the unloading conveyor, and taken substantially along a plane as indicated by the line 7—7 of Figure 2;

Figure 8 is a fragmentary side elevational view showing the automatic unloading control associated with the truck body and before commencement of the unloading operation, and Figure 9 is an enlarged fragmentary cross sectional view, taken substantially along a plane as indicated by the line 9—9 of Figure 8, showing the traveling block positioned for removal from the apparatus at the end of its travel.

Referring more specifically to the drawings, for the purpose of illustrating one application and use of the automatic discharge control for truck bodies, designated generally 12 and comprising the invention, the rear portion, designated generally 13, of a conventional truck has been illustrated including an elongated truck frame or chassis 14 on which a truck body, designated generally 15, is supported, longitudinally of the frame or chassis 14. The truck body 15 includes side walls 16 and 17, a front wall 18, and a rear wall 19. Said walls are provided with downwardly and inwardly sloping bottom portions 16a, 17a, 18a and 19a, respectively, which are suitably mounted on and supported by the chassis 14 at their lower and inner ends around a longitudinally extending trough 20, which is supported by the frame or chassis 14, and which opens upwardly into the bottom of the truck body 15. The frame or chassis 14 is substantially wider than the trough 20 and the open lower part of the body 15, which is disposed thereabove, as seen in Figure 3. Platforms 21 and 22 are supported on and secured to the chassis or frame 14 on opposite sides of the trough 20 and extend longitudinally of said frame and are disposed beneath the sloping side wall portions 16a and 17a, respectively.

As best seen in Figure 2, inwardly opening angle members extend transversely across the trough 20, adjacent its ends, and outwardly transversely across the platform or floor 21, said angle members being designated 23 and 24 and being disposed partially beneath the sloping front and rear wall portions 18a and 19a, respectively. Between the angle members 23 and 24 a plurality of longitudinally spaced transversely extending combination guides and rails are provided, each designated generally 25. The members 25 extend transversely across the trough 20 at the open top thereof and in the same horizontal plane as the angle members 23 and 24, and across the floor or platform 21. The members 25 are preferably each of an inverted T-shape cross section as illustrated in Figure 2, so as to constitute the equivalent of two angle members arranged with their vertical sides in abutting engagement. Each of the guide members and rails 25 is provided with upwardly facing side surfaces 26 extending longitudinally thereof and forming rails. Said side surfaces 26 of the end members 25 cooperate with the bottom flanges of the angle members 23 and 24 to form tracks for slidably supporting end closure plates or doors 27 and 32 located adjacent the rear and front ends, respectively, of the trough 20 and truck body 15. The guides and supports 25 also support four additional corresponding closure plates or doors 28, 29, 30 and 31 arranged respectively from rear to front of the truck between the end doors 27 and 32. However, a greater or lesser number of doors could be provided, depending upon the length of the truck body. Corresponding longitudinally bowed levers 33 are pivotally mounted by pivot pins 34 above the upper intermediate portions of the guide and support members 25 and on an upper portion of the front angle member 23, adjacent outer ends of said members 25 and 23 and laterally spaced from the trough 20. The levers 33 are journaled on the pivot pins 34 nearer outer ends 35 thereof than their other, longer inner ends 36, and are mounted for swinging movement substantially in the same horizontal plane. Each of the levers 33 is provided with an elongated slot 37 in its longer end 36 and which extends to adjacent the distal part thereof. Each of the closure elements 27—32, adjacent an outer end thereof which is disposed over the floor or platform 21, has a stud 38 anchored therein and extending upwardly therefrom loosely through the slot 37 of the lever end 36, which overlies the outer end of the closure element. Thus, each of the levers 33 is connected by a stud 38 to a closure element individual thereto, as best illustrated in Figure 1. The opposite shorter and outer ends 35 of the levers 33 normally extend outwardly from the outer edge of the floor or platform 21 and are so disposed, as seen in Figures 1, 3 and 6, when the closure elements 27—32 are in closed positions over the trough 20. The inner lever ends 36 are disposed below the level of the outer lever ends 35 whereby said lever ends 36 may swing under the lever ends 35 as the closure plates are moved by the levers 33 to open positions.

A threaded shaft or feed screw 39 has unthreaded end portions which are journaled in bearings 40 and 41. Said bearings 40 and 41 are secured to and extend laterally from the frame or chassis 14 adjacent the rear and front ends, respectively, of the truck body 15, and project outwardly to beyond the outer longitudinal edge of the floor or platform 21, for supporting and journaling the feed screw 39 outwardly with respect to said outer edge of the floor 21 and beneath the lever ends 35, when the closure elements are in closed positions. The shaft or feed screw 39 is threaded from adjacent the bearing 40 forwardly to adjacent or slightly beyond the forward end of the floor 21 and therebeyond includes a relatively short unthreaded portion 42, extending to the forward end thereof which is journaled in the bearing 41. A belt pulley 43 is fixed to the shaft portion 42 on the inner side of and adjacent the bearing 41.

As seen in Figure 1, a conventional power takeoff shaft 44 of the truck 13 is located to the right of the longitudinal axis of the truck and thus is disposed forwardly of and in alignment with a portion of the floor or platform 21. A countershaft 47 is disposed above the power takeoff shaft 44 and is journaled in a bearing 48, which is secured to a part of the frame 14. Belt pulleys 44a and 47a are secured to the shafts 44 and 47, respectively. An endless belt 44b is trained over the belt pulleys 44a and 47a for driving the shaft 47 from the shaft 44. A belt pulley 45, of smaller diameter than the belt pulley 43, is fixed to the shaft 47 in transverse alignment with the belt pulley 43 and said belt pulleys are connected by an endless belt 46. The shaft 47 projects rearwardly to beyond the belt pulley 45, which is disposed behind the belt pulley 47b, and terminates over the forward end of the floor 21. A worm 49 is fixed to the rear end of the shaft 47 and is disposed in a notch or opening 21a of the floor 21.

As best illustrated in Figure 2, a conveyor unit, designated generally 50, is disposed in the trough 20 for conveying the contents thereof from the forward toward the rear end of said trough. Said conveyor unit 50 as illustrated comprises an endless conveyor belt 51 which extends substantially from end-to-end of the trough 20 and to beyond the end closure elements 27 and 32 and which is trained over rollers 52 and 53 which extend transversely through and are journaled in end portions of the trough 20. The front roller 52 constitutes the driving roller or pulley of the endless conveyor element 51 and the rear roller or pulley 53 constitutes an idler pulley thereof. Each of said pulleys is fixed to a shaft which projects beyond the ends thereof and is journaled in side walls of the trough 20. The shaft 54 of the front drive roller or pulley 52 has a worm wheel 55 fixed to one end thereof and which meshes with the worm 49 for driving the upper flight of the endless conveyor element 51 from front to rear, as indicated by the arrows 56 in Figures 2 and 7, when the power takeoff shaft 44 and its extension 47 are rotated in the direction as indicated by the arrows 57 in Figures 1 and 7. As seen in Figure 3, the endless conveyor element 51 is of a width only slightly less than the width of the trough 20. A plurality of idler supporting rollers 58 are journaled in the trough 20 and transversely thereof. The idler supporting rollers 58 are disposed in longitudinally spaced relationship to one another and beneath the upper flight of the endless conveyor element 51, for supporting said upper flight in substantially a horizontal plane between the rollers or pulleys 52 and 53. It will be readily obvious that other forms of conveyor units could be substituted for the conveyor unit 50 for conveying material lengthwise of the trough 20 toward its rear end, as for example a screw conveyor.

The trough 20 is closed at its forward end as seen in Figure 2 and is provided with a flared outwardly and downwardly opening rear end or spout 59, disposed beyond and adjacent the rear roller 53, into which material from the upper flight of the conveyor element 51 is discharged as said upper flight passes downwardly around the rear roller 53. The trough 20 at the inner end of its flared portion or spout 59 is provided with a gate valve 60 for closing said trough. The gate valve 60 is slidably mounted for vertical sliding movement in guide channels 61 which slidably receive side edges of the valve 60 and which extend upwardly from the trough 20 and spout 59. An actuating lever 62 is pivotally mounted intermediate of its ends at 63 on an ear or bracket 64 which extends from a part of the truck body 15 and has an outer end 65 forming a handle. A link or connecting rod 66 has an upper end connected by a pivot pin 67 to the other, inner end of the lever 62 and has a lower end connected by a pivot pin 68 to the outer side of the valve 60. Thus, by manually engaging and swinging the handle end 65 downwardly, the inner end of said lever and the link 66 will be displaced upwardly for raising the valve 60 to an open position from its closed position as illustrated in Figures 2 and 5. The sloping rear wall portion 19a may be provided with an external indentation 19b, as seen in Figure 2, to accommodate the inner end of the lever 62 and the upper part of the link 66 in the raised position of the valve 60.

A traveling block, designated generally 69, is formed of similarly shaped sections 70 and 71, each constituting a longitudinal half of the block 69 and which are hingedly connected together at their upper ends by a hinge 72 to assume abutting engagement with one another from end-to-end thereof, in a closed position of the block 69. Upper portions of inner faces of the block sections are notched and threaded to combine to form a threaded bore 73 which threadedly engages the feed screw 39 when the block 69 is closed. A bolt 74 is fixed in the inner block section 70 and has a threaded end extending through a longitudinally elongated slot 75 of the outer block section 71 and is engaged by a wing nut 76 to hold the block sections in abutting engagement, as seen in Figure 6, to maintain the bore 73 in threaded engagement with the feed screw 39. Said bore 73 is disposed between the bolt 74 and hinge 72. A lower guide strip 77 is secured to the underside of the outer edge of the floor or platform 21 and is slidably engaged by a portion of the inner block section 70. An upper guide strip 78 is disposed above and spaced from the outer longitudinal edge of the platform 21 and is disposed to be engaged by the inner block section 70, adjacent the upper end thereof, as seen in Figure 6. The upper guide strip 78 is supported above the level of the levers 33 by posts 79 which are fixed to and rise from the floor 21 and which are disposed so as not to interfere with swinging movement of the lever ends 35 inwardly over the floor 21. The guide strips 77 and 78 extend from adjacent the rear bearing 40 to a point in transverse alignment with the unthreaded forward part 42 of the feed screw 39, but rearwardly spaced from the belt pulley 43 a distance greater than the width or thickness of the traveling block 69.

Assuming that the truck body 15 is filled with a fluent material, not shown, such as coal, and that the closure elements 27—32 are in closed positions over the trough 20, so as to form the bottom of the truck body, in combination with the guide and support elements 25, when it is desired to unload the truck body 15, the traveling block 69 is applied to the feed screw 39 forwardly of and adjacent the rear bearing 40, as illustrated in dotted lines in Figure 1. As seen in Figure 3, adequate space is available above the feed screw 39 and beneath the sloping side wall portion 16a to accomplish this. With the nut 76 removed and the block sections open, the inner block section 70 is inserted downwardly behind the guide strips 77 and 78 inwardly of feed screw 39, after which the outer block section 71 is swung inwardly against the inner block section 70 and to engage the threaded opening 73, formed by portions of said block sections, around the feed screw 39. The nut 76 is then applied and tightened against the outer block section 71 to retain the block in threaded engagement with the feed screw.

The power takeoff shaft 44 is then actuated in a conventional manner to rotate in the direction as indicated by the arrow 57 in Figure 1 for turning the feed screw 39 in the same direction and for driving the upper flight of the endless conveyor 51 rearwardly, as indicated by the arrows 56 in Figure 2. This will cause the traveling block 69 to move forwardly on the feed screw 39 due to the fact that said traveling block is prevented by the strips 77 and 78, primarily the strip 78, from rotating with the feed screw. The operator can then move to a position at the rear of the truck body to open the closure or gate valve 60 by manually swinging the lever 62 clockwise as seen in Figure 5. Any suitable latch means, not shown, may be provided to maintain the gate valve 60 in an open position. At the same time, actuation of the power takeoff shaft 44 will drive the endless conveyor as previously mentioned, simultaneously with the rotation of the feed screw. The feed screw is driven at a slow speed relatively to the power takeoff shaft and countershaft 47 by the difference in the diameters of the belt pulleys. During its forward travel, the block 69 will initially strike the lever end 35 of the lever 33 which is connected to the rearmost closure 27 to swing said lever counterclockwise, as seen in Figure 1, to the dotted line position of the lever 33 which is connected to the closure 31, as seen in Figure 1, which will thus move the closure 27 outwardly over the floor 21 to a position corresponding to the dotted line position of the closure 31. The contents of the rear portion of the truck body will thus be permitted to discharge by gravity through the opening between the bottom edges of the sloping side wall portions 16a and 17a and the rear angle member 24 and the adjacent guide and support element 25. Obviously, some of the material disposed above the next rearmost closure 28 will also be discharged through this opening. The shaft or feed screw 39 is driven at a speed so that when the discharge through the rearmost opening, exposed by opening of the plate 27, has been completed, the travel block 69 will have engaged and similarly turned the lever 33 connected to the closure plate 38 for opening this closure plate, so that an additional portion of the contents of the truck body 15 will be discharged. In this manner, the operation will be successfully repeated by the traveling block 69 moving forwardly and succesively actuating the levers 33 of the other closures 29, 30, 31 and 32 successively in that order for completely emptying the truck body 15 by gravity into the trough 20 and onto the upper flight of the conveyor element 51. It will thus be seen that the conveyor element 51 will not be overloaded at any time and the material successively discharged by gravity thereon will in each instance be forwardly of the material previously discharged thereon by gravity and which has previously been conveyed rearwardly and discharged into the spout or outlet portion 59. Thus, overloading of the conveyor unit 50 and possible choking of the trough 20 is eliminated.

It will also be apparent that the aforedescribed operation can be accomplished by a single operator, as for example the driver of the truck 13, who may remain in a position at the rear of the truck body to check the discharge of the material from the spout or outlet 59 into a chute or other conveyor means, not shown, and, if necessary, to prevent clogging of the material in said chute after it has been discharged from the spout 59. After all of the closures 27—32 have thus been opened, the traveling block 69 will move into engagement with the unthreaded feed screw portion 42 which will turn freely therein. After all of the material has been dispensed from the truck body 15 and from the spout 59, as previously described, the operator may return the gate valve 60 to a closed position and may then interrupt operation of the power takeoff shaft 44. The levers 33 are then turned manually in clockwise directions as seen in Figure 1 about their pivots 34 to return the closures 27—32 to their full line closed positions of Figure 1, preparatory to reloading the truck body 15. The nut 76 can then be removed and the travel block sections opened and the travel block removed from the unthreaded shaft portion 42 between the pulley 43 and the forward ends of the guide strips 77 and 78. The travel block 69 can then be re-applied, as previously described, to the rear portion of the feed screw 39, preparatory to the next unloading operation. The guide strips 77 and 78 preferably terminate a sufficient distance forwardly of the rear bearing 40 to allow the travel block section 70 to be applied to the feed screw between said bearing 40 and the rear ends of the strips 77 and 78. Likewise, the rear end portion of the outer edge of the floor 21 is spaced a sufficient distance from the feed screw 39 to afford ready application of the travel block section 70, which may then be slipped forwardly into engagement with the rear ends of the strips 77 and 78 before the travel block 69 is again closed and the nut 76 re-applied.

If desired, the truck body 15 may be divided into end sections by a partition 80 so that one half only of the truck body 15 may be discharged. When so utilized, rotation of the power takeoff shaft 44 can be interrupted immediately before the travel block contacts the lever 33 connected to the closure 30 to prevent opening of said closure. The power takeff shaft can thereafter be again actuated to cause the travel block, at a subsequent time, to successively actuate the forward three levers 33 for successively opening the closures 30, 31 and 32, respectively.

On some trucks the power takeoff shaft 44 is disposed to the left of the longitudinal center of the truck, rather than to the right thereof as illustrated in Figure 1, in which case the automatic discharge control 12 may be associated with the other, left floor or platform 22 to function in the same manner as previously described.

Various other modifications and changes are contemplated and may obviously be resorted to, without departing from the spirit or scope of the invention as hereinafter defined by the appended claims.

I claim as my invention:

1. An automatic discharge control for truck bodies of the character described comprising a truck including an elongated chassis, a truck body having an elongated open bottom extending longitudinally thereof and of the truck chassis, a trough supported by the truck chassis beneath the open bottom of the truck body, said trough having an open rear discharge end, a conveyor unit operatively disposed in said trough and arranged to operate in a direction for conveying material longitudinally through the trough toward the open rear end thereof, a plurality of closure elements disposed between the open bottom of the truck body and the open top of said trough, means supporting said closure elements for sliding movement transversely of the truck body and trough and combining with said closure elements for closing the bottom of the truck body from end-to-end thereof, when said closure elements are in closed positions, a power takeoff shaft forming a part of said truck, a plurality of levers, including a lever individual to each of said closure elements and having an end slidably and pivotally connected thereto and a second outer end, said levers being pivoted for swinging movement in planes substantially parallel to the plane of said closure elements and at points spaced from the lever ends, and means driven by said power takeoff shaft including an element mounted to travel longitudinally of the chassis from adjacent the rear to adjacent the forward end of the truck body, said outer ends of the levers being disposed in the path of movement of said traveling element when the closures are in closed positions for successively actuating the levers for successively moving the closure elements slidably in a direction transversely of the truck body from a closed to an open position from the rear to the forward end of the truck body to progressively release the contents of the truck body to be discharged by gravity into the trough from the rear to the forward ends of the trough and truck body.

2. An automatic discharge control as in claim 1, said driven means comprising a feed screw, means supporting and journaling said feed screw longitudinally of the truck body, and means forming a driving connection between the feed screw and power takeoff shaft.

3. An automatic discharge control as in claim 2, said traveling element comprising a block threadedly engaging the feed screw, and guide means disposed substantially parallel to the feed screw and engaged by said block and preventing rotation of the block with the feed screw.

4. An automatic discharge control as in claim 3, said block being formed of swingably connected sections demountably secured to the feed screw.

5. An automatic discharge control as in claim 1, and means forming a driving connection between said conveyor unit and power takeoff shaft for driving the conveyor unit simultaneously with said driven means whereby the conveyor unit is actuated for conveying material toward the rear discharge end of the trough when said driven means is actuated for successively opening the closure elements from the rear to the forward end of the truck body.

6. An automatic discharge control as in claim 1, said levers each being longitudinally bowed from end-to-end thereof and each having a longitudinally elongated and curved slot located adjacent the end thereof disposed remote from the outer end of the lever, said closure elements each comprising a plate having an upstanding stud loosely engaging the slot of the lever individual thereto, and said stud being disposed rearwardly with respect to the truck body relative to the pivot of the lever engaged by the stud.

7. An automatic discharge control of the character described comprising a truck having a driven power takeoff shaft, an elongated chassis, a truck body supported on said chassis longitudinally thereof and having an elongated open bottom extending longitudinally of the chassis, a trough supported by the chassis longitudinally thereof and disposed beneath the open bottom of the truck body, a plurality of closure elements closing the open bottom of the truck body, means slidably supporting said closure elements for transverse sliding movement relatively to the truck body between closed and open positions, swingably mounted actuating means individual to said closure elements and swingably movable for slidably moving the closure elements to and from open and closed positions, and means driven by said power takeoff shaft and supported by the truck chassis including a traveling element movable longitudinally of the truck body from rear to front thereof and successively engaging said actuating means for successively opening the closure elements from the rear to the forward end of the truck body for progressively discharging by gravity the contents of the truck body into said trough.

8. An automatic discharge control as in claim 7, said trough having an open rear discharge end, a conveyor unit disposed in said trough, and means forming a driving connection between the conveyor unit and power takeoff shaft whereby the conveyor unit is actuated simultaneously with the movement of said traveling element for conveying the material to the rear end of said trough as the material is supplied to the trough by gravity progressively from the rear to the forward end of the trough.

9. In combination with a supporting frame having an elongated hopper body mounted thereon and including an elongated open bottom extending longitudinally of the hopper and a trough supported by the frame and disposed beneath and longitudinally of the open bottom of the hopper; an automatic discharge control comprising a plurality of closure elements closing the open bottom of the hopper, means slidably supporting said closure elements for transverse sliding movement relative to the hopper between closed and open positions thereof, actuating means individual to said closure elements swingably mounted on the frame and connected to said closure elements and swingably movable for slidably moving the closure elements to and from open and closed positions, and driven means supported by said frame and movable longitudinally of the hopper for successively engaging said actuating means to successively open the closure elements from one end to the other end of the hopper for accomplishing a progressive discharge by gravity of the contents of the hopper into said trough.

References Cited in the file of this patent

UNITED STATES PATENTS

| | | |
|---|---|---|
| 669,876 | Critchlow | Mar. 12, 1901 |
| 1,608,610 | Meyer | Nov. 30, 1926 |
| 1,921,959 | Warren | Aug. 8, 1933 |
| 2,138,695 | Duncan | Nov. 29, 1938 |
| 2,275,799 | Oklejas | Mar. 10, 1942 |
| 2,412,121 | Bradshaw | Dec. 3, 1946 |
| 2,589,988 | Bruno | Mar. 18, 1952 |